(12) United States Patent
Lee et al.

(10) Patent No.: US 9,201,951 B2
(45) Date of Patent: Dec. 1, 2015

(54) SYSTEM AND METHOD FOR PROVIDING SEARCH RESULTS

(75) Inventors: Song Hee Lee, Seongnam-si (KR); Tae Ho Lee, Seongnam-si (KR)

(73) Assignee: NHN CORPORATION, Seongsam-Si (KR)

( * ) Notice: Subject to any disclaimer, the term of this patent is extended or adjusted under 35 U.S.C. 154(b) by 131 days.

(21) Appl. No.: 13/519,856

(22) PCT Filed: Nov. 15, 2010

(86) PCT No.: PCT/KR2010/008032
§ 371 (c)(1),
(2), (4) Date: Jun. 28, 2012

(87) PCT Pub. No.: WO2011/081296
PCT Pub. Date: Jul. 7, 2011

(65) Prior Publication Data
US 2012/0290568 A1 Nov. 15, 2012

(30) Foreign Application Priority Data

Dec. 29, 2009 (KR) .................. 10-2009-0132702

(51) Int. Cl.
*G06F 17/30* (2006.01)
(52) U.S. Cl.
CPC ................. *G06F 17/30696* (2013.01)
(58) Field of Classification Search
CPC ............ G06F 17/30696; G06F 17/30554; G06F 17/3058; G06F 17/30991
See application file for complete search history.

(56) References Cited

U.S. PATENT DOCUMENTS

| 7,966,324 | B2 * | 6/2011 | Sathe | 707/732 |
| 8,176,041 | B1 * | 5/2012 | Harinarayan et al. | 707/722 |
| 2005/0289140 | A1 * | 12/2005 | Ford et al. | 707/5 |
| 2008/0046411 | A1 | 2/2008 | Lee | |
| 2008/0184137 | A1 * | 7/2008 | Grimm et al. | 715/760 |

FOREIGN PATENT DOCUMENTS

| JP | 09-231238 | 9/1997 |
| JP | 2002-183210 | 6/2002 |
| JP | 2007-517317 | 6/2007 |
| JP | 2007-172375 | 7/2007 |
| JP | 2009-037602 | 2/2009 |
| JP | 2009-053181 | 3/2009 |
| KR | 100469824 | 2/2005 |

(Continued)

OTHER PUBLICATIONS

International Search Report dated Jun. 10, 2011 for corresponding KR Application No. 10-2009-0132702.

(Continued)

*Primary Examiner* — Anh Tai Tran
(74) *Attorney, Agent, or Firm* — Harness, Dickey & Pierce, P.L.C.

(57) ABSTRACT

Disclosed are a system and method for providing search results. The system for providing search results comprises: a keyword-receiving unit which receives a keyword from a user; an exposure-order-applying unit which applies, to a collection search bar, the order of exposure of a collection containing a listing of keyword search results; and a search-result-providing unit which provides the user with a webpage of the keyword search results, said webpage containing the collection search bar.

18 Claims, 5 Drawing Sheets

(56) References Cited

FOREIGN PATENT DOCUMENTS

| KR | 1020050095230 | 9/2005 |
| KR | 1020050101290 | 10/2005 |
| KR | 1020080066632 | 7/2008 |
| WO | WO 2008/084930 | 7/2008 |

OTHER PUBLICATIONS

Office Action for corresponding Japanese Application No. 2012-546985 dated Dec. 24, 2013.

* cited by examiner

SYSTEM AND METHOD FOR PROVIDING SEARCH RESULTS

CROSS-REFERENCE TO RELATED APPLICATIONS

This application is the National Stage Entry of International Application No. PCT/KR2010/008032, filed on Nov. 15, 2010, and claims priority from and the benefit of Korean Patent Application No. 10-2009-0132702, filed on Dec. 29, 2009, both of which are hereby incorporated by reference for all purposes as if fully set forth herein.

BACKGROUND

1. Field

The present invention relates to a system and method for providing a search result, and more particularly to a system and method for determining an order for exposing a collection according to click information, and providing a collection search bar on which the order for exposing a collection is reflected by including the collection search bar on a search result page.

2. Discussion of the Background

A search engine may generate a search result page by extracting a search result corresponding to a keyword input by a user, and provide the search result page to the user. In response to receiving a search request from the user, the search engine may provide the user with various categories corresponding to the search request, for example, a café, a blog, a search result listing, books, news, image, and the like. The categories may be disposed at a top of the search result page through being expressed in a search bar form. The user may select, from a search bar, a category including desired content, and verify a search result for the corresponding category.

In a conventional art, an order for exposing a collection may change according to a keyword. However, an order for categories may be constantly fixed in a search bar and thus, an order for exposing a collection may not be verified in advance without scrolling through a search result page. Further, an order for exposing a collection may insufficiently reflect a user preference, which may involve an issue of failing to provide a search result page desired by a user.

SUMMARY

An exemplary embodiment of the present invention provides a system and method that may enable a user to easily predict an order for exposing a collection without scrolling through a search result page by determining the order for exposing a collection according to a keyword input by the user, and reflecting the order to a collection search bar.

Another exemplary embodiment of the present invention provides a system and method for enhancing a convenience of conducting a search for a user by providing a search result page on which a collection corresponding to a collection tab is displayed when the user selects the collection tab of a collection search bar on which an order for exposing a collection is reflected.

According to an exemplary embodiment of the present invention, there is provided a system for providing a search result, the system including a keyword receiving unit to receive a keyword from a user, an exposure order applying unit to apply, to a collection search bar, an order for exposing a collection including a list of search results for the keyword, and a search result providing unit to provide the user with a search result page, for the keyword, including the collection search bar.

The system may further include an exposure order determining unit to determine an order for exposing a collection to be different according to a user preference for the collection of the keyword.

According to another exemplary embodiment of the present invention, there is provided a method of providing a search result, the method including receiving a keyword from a user, applying, to a collection search bar, an order for exposing a collection including a list of search results for the keyword, and providing the user with a search result page, for the keyword, including the collection search bar.

The method may further include determining an order for exposing a collection to be different according to a user preference for the collection of the keyword.

According to exemplary embodiments of the present invention, it is possible to enable a user to easily predict an order for exposing a collection without scrolling through a search result page by determining an order for exposing a collection according to a keyword input by the user, and reflecting the order to a collection search bar.

According to exemplary embodiments of the present invention, it is possible to enhance search convenience for a user by providing a search result page on which a collection corresponding to a collection tab is displayed when the user selects the collection tab of a collection search bar on which an order for exposing a collection is reflected.

DETAILED DESCRIPTION OF THE ILLUSTRATED EMBODIMENTS

Figure 1:
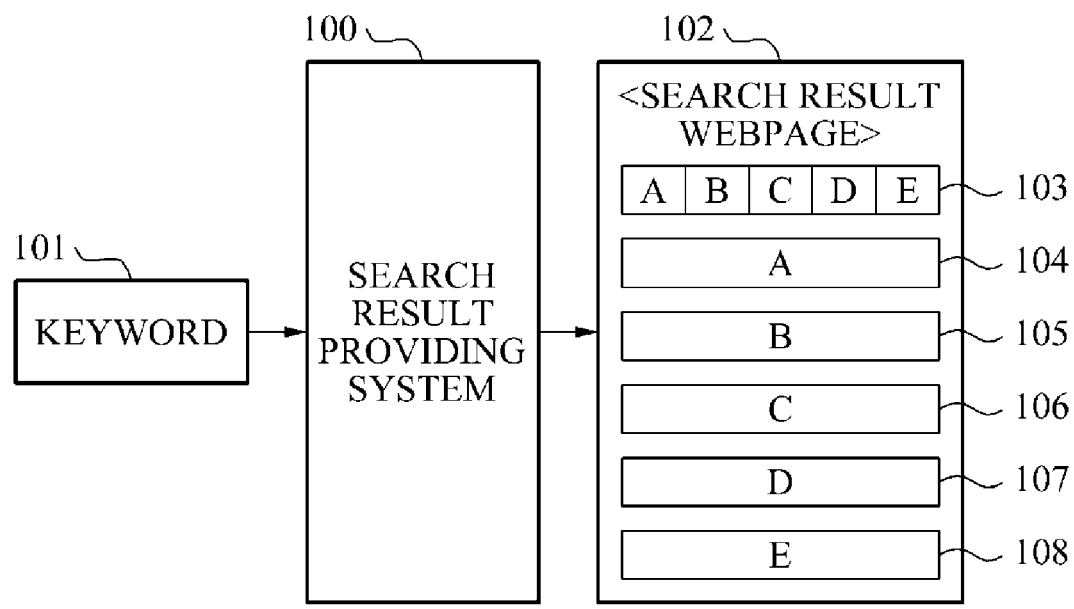
FIG. 1 is a diagram illustrating an operation of providing a search result according to exemplary embodiments of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating an operation of providing a search result according to exemplary embodiments of the present invention.

Referring to FIG. 1, a search result providing system 100 may provide a search result webpage 102 corresponding to a keyword 101 received from a user. As an example, the search result webpage 102 may include a plurality of a collection, for example, a collection 104, 105, 106, 107, and 108 and a collection search bar 103 on which an order for exposing a collection is reflected. In this instance, a collection may refer to a category of a list of search results provided through the search result webpage 102 when a user inputs a keyword into a search window. For example, the collection may include news, a blog, a web document, a café, a shopping mall, Knowledge iN, an image, a moving image, a dictionary, and the like.

According to embodiments of the present invention, an order for exposing the collection 104 through 108 may be determined to be different according to the keyword 101 input by the user. The order for exposing the collection 104 through 108 may be applied to the collection search bar 103. Then, the user may predict the order for exposing the collection 104 through 108 with reference to the collection search bar 103 without directly scrolling the search result webpage 102.

Figure 2:
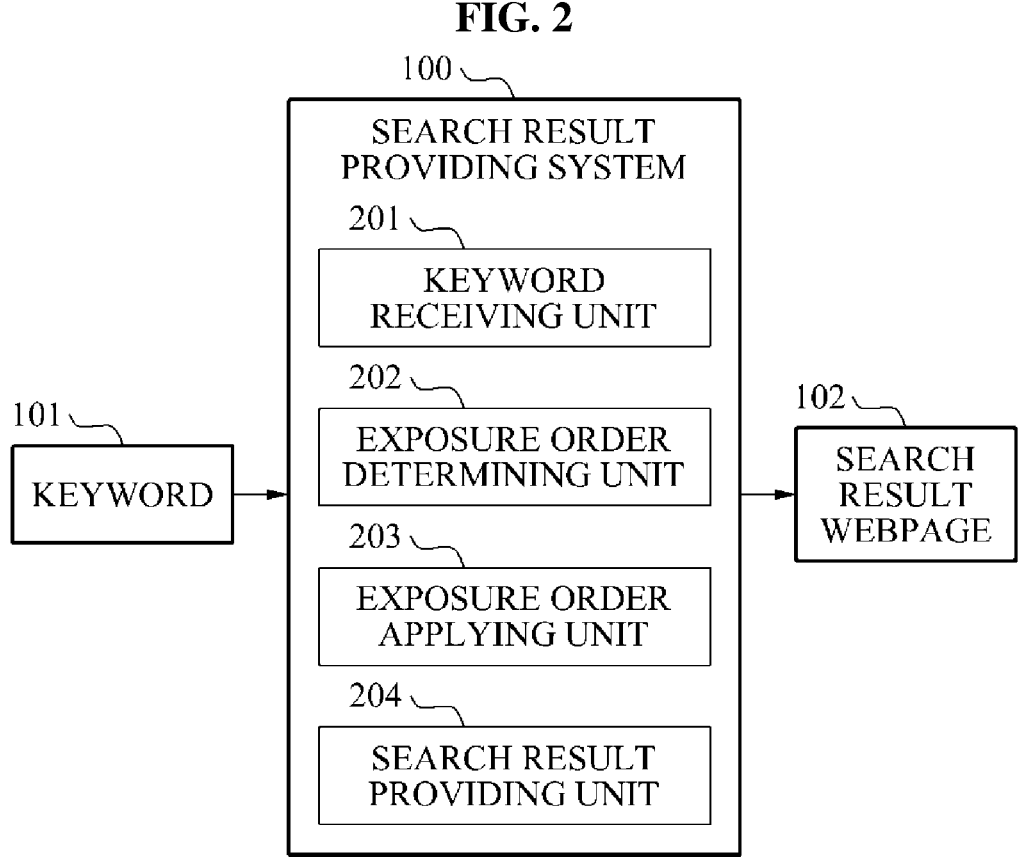
FIG. 2 is a diagram illustrating a detailed configuration of a system for providing a search result according to exemplary embodiments of the present invention.

FIG. 2 is a diagram illustrating a detailed configuration of a system for providing a search result according to exemplary embodiments of the present invention.

Referring to FIG. 2, a search result providing system 100 may include a keyword receiving unit 201, an exposure order determining unit 202, an exposure order applying unit 203, and a search result providing unit 204.

The keyword receiving unit 201 may receive a keyword 101 from a user. That is, the user may request a search by inputting the keyword 101 into the search result providing system 100.

The exposure order determining unit 202 may determine an order for exposing a collection to be different according to a user preference for a collection of the keyword 101. That is, the exposure order determining unit 202 may determine an order for exposing a collection according to a characteristic of the keyword 101.

As an example, when the user preference for a collection of the keyword 101 exceeds a predetermined reference value, the exposure order determining unit 202 may determine, using click information of the collection, the order for exposing a collection. Here, a continuous keyword that has a continuous search log for the keyword 101, and clearly has an increase in selection of a collection by a user for each season or time may correspond to a case where a user preference for the collection exceeds a predetermined reference value.

In this instance, the exposure order determining unit 202 may determine, using a number of instances when a list of search results included in the collection is clicked on, the order for exposing a collection. A detailed operation of determining the order for exposing a collection will be described with reference to FIG. 3.

Whereas, when the user preference for a collection of the keyword 101 is less than a predetermined reference value, the exposure order determining unit 202 may determine, using a default ranking of the collection, the order for exposing a collection. Here, a new keyword that has a lower frequency in a search log for the keyword 101 when compared to a predetermined reference, or an emergency keyword that has an unclear user preference may correspond to a case where the user preference for the collection is less than a predetermined reference value.

The exposure order applying unit 203 may apply, to a collection search bar, an order for exposing a collection including a list of search results for a keyword. In this instance, the exposure order applying unit 203 may adjust a position of a collection tab included in the collection search bar according to the order for exposing a collection. That is, an order for exposing a collection may change according to a keyword, and a position of a collection tab of a collection search bar may change according to the order for exposing a collection. A user may verify an order for exposing a collection through the collection search bar without scrolling through a search result page.

The search result providing unit 204 may provide a user with a search result page, for a keyword, including the collection search bar. An external shape of the collection search bar may change according to a configuration of the system. As an example, when the user selects a collection tab from the search result page, the search result providing unit 204 may provide a search result page on which a collection corresponding to the collection tab is displayed. That is, when the user selects a collection tab of the collection search bar, the user may jump to a selected collection area without scrolling through the search result page.

Figure 3:
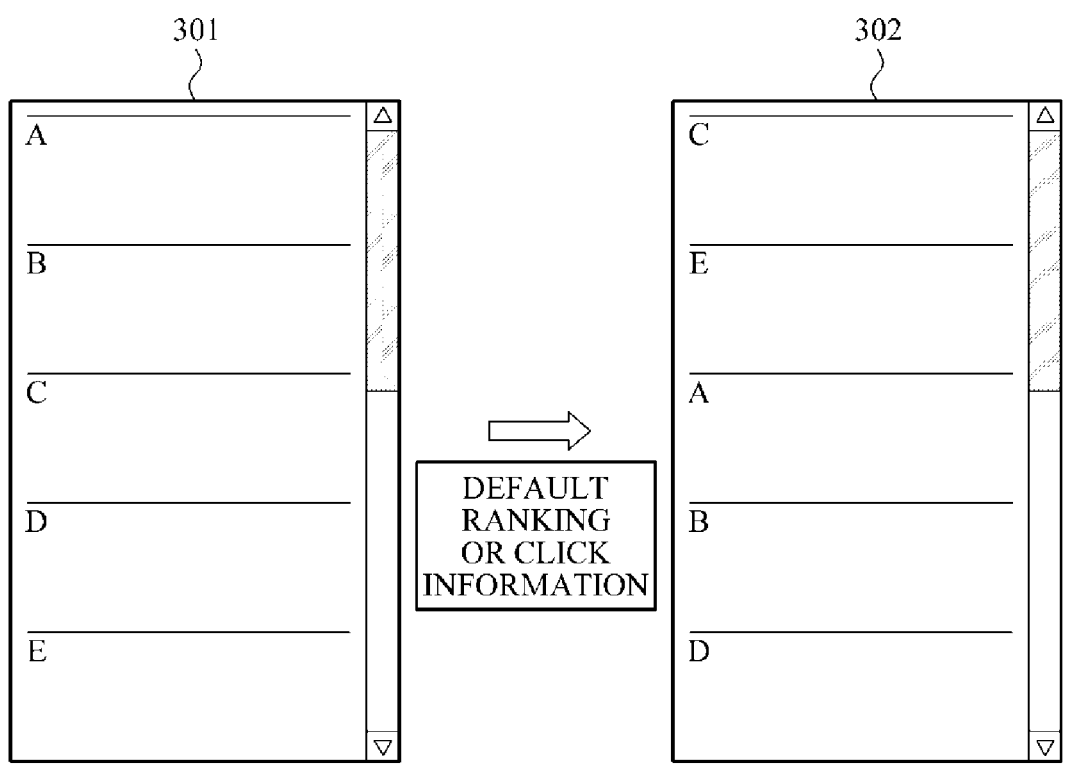
FIG. 3 is a diagram illustrating an operation of determining an order for exposing a collection according to exemplary embodiments of the present invention.

FIG. 3 is a diagram illustrating an operation of determining an order for exposing a collection according to exemplary embodiments of the present invention.

FIG. 3 illustrates a search result page 301 on which an order for exposing a collection is fixed. The collection may correspond to A, B, C, D, and E, and each collection may include a list of at least one search result corresponding to a keyword.

The search result providing system 100 may determine an order for exposing a collection to be different according to a user preference for the collection of a keyword. When the user preference for the collection of the keyword exceeds a predetermined reference value, the search result providing system 100 may determine, using click information of the collection, the order for exposing the collection.

As an example, when the user preference for the collection of the keyword exceeds a predetermined reference value, the search result providing system 100 may determine the order for exposing the collection using a number of instances a list of search results included in the collection is clicked on. For example, when a descending order for a number of instances a list of search results included in the collection is clicked on corresponds to C, E, A, B, and D, the order for exposing the collection may be determined as illustrated on a search result page 302. Here, the number of instances a list of search results is clicked on may be determined to be a click log measured for a predetermined period of time.

When the user preference for the collection of the keyword is less than a predetermined reference value, the search result providing system 100 may determine, using a default ranking of the collection, the order for exposing the collection. The default ranking of the collection may be predetermined according to a system configuration.

Figure 4:
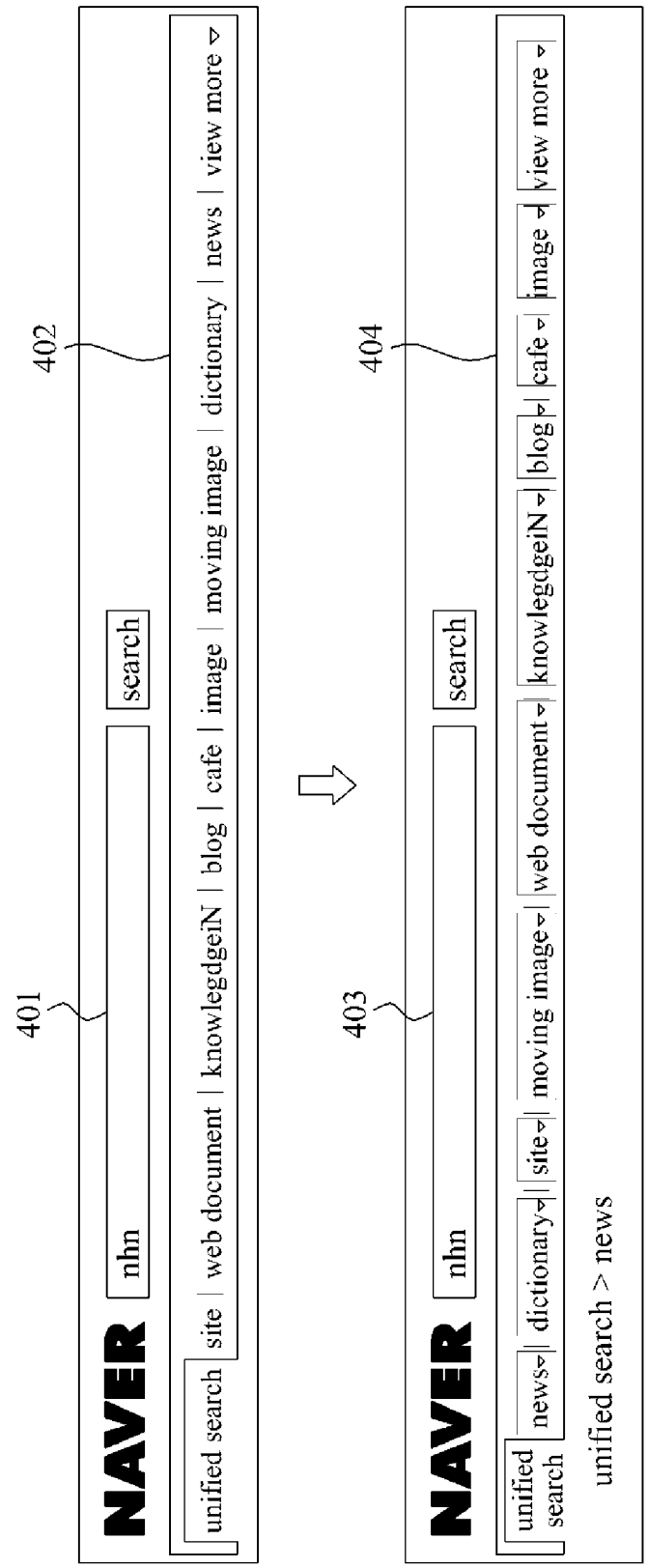
FIG. 4 is a diagram illustrating a result of adjusting a position of a collection tab in a collection search bar according to exemplary embodiments of the present invention.

FIG. 4 is a diagram illustrating a result of adjusting a position of a collection tab in a collection search bar according to exemplary embodiments of the present invention.

FIG. 4 illustrates a collection search bar 402 included in a search result page when a user inputs "nhn" into a search window 401. A position of collection tabs has been fixed in an order of "site, web document, knowledge iN, blog, café, image, moving image, dictionary, and news."

According to embodiments of the present invention, an order for exposing a collection displayed on a search result page may change according to a keyword input by a user. Thus, a position of collection tabs of a collection search bar 404 may be adjusted according to an order for exposing a collection. In response to the user inputting "nhn" into a search window 403, a position of collection tabs may change to an order of "news, dictionary, site, moving image, web document, knowledge iN, blog, café, and image." A position of a collection tab in the collection search bar 404 may be determined to be different according to an attribute of a keyword input by the user.

According to embodiments of the present invention, in response to the user selecting one of collection tabs in the collection search bar 404, a search result page on which a collection corresponding to the selected collection tab is displayed may be provided. That is, the user may predict an order for exposing a collection for a keyword through the collection search bar 404 without scrolling through a search result page. Further, when the user selects a predetermined collection tab from the collection search bar 404, the user may jump to the corresponding collection area without scrolling through the search result page and thus, search convenience for the user may be enhanced.

Figure 5:
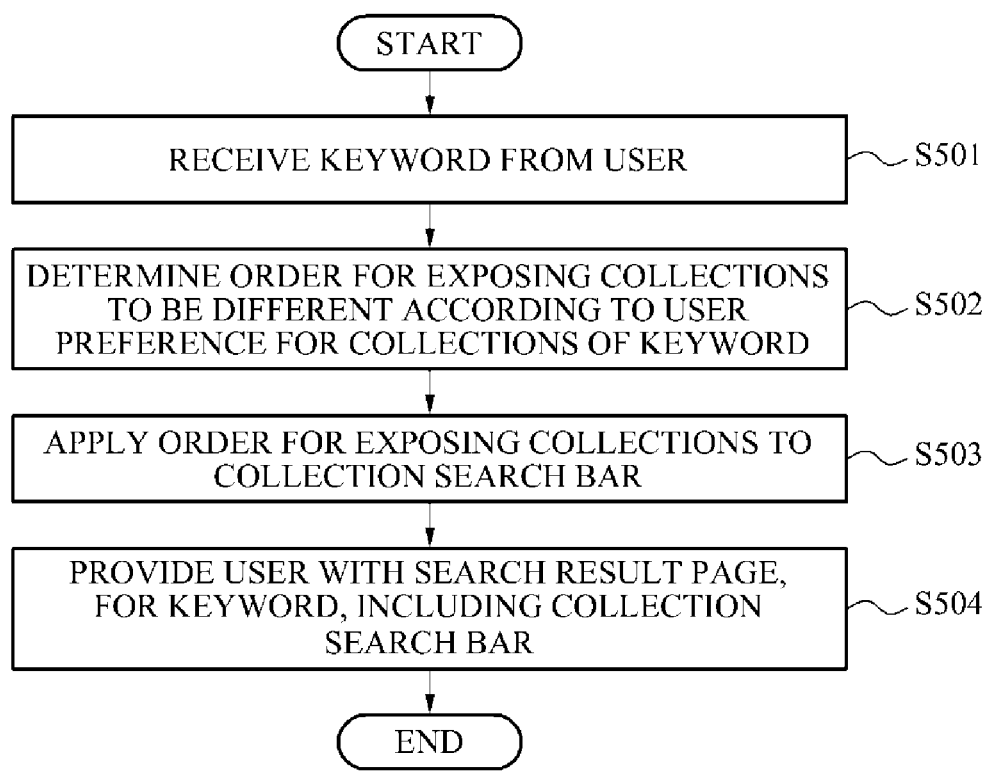
FIG. 5 is a flowchart illustrating an operation of a method of providing a search result according to exemplary embodiments of the present invention.

FIG. 5 is a flowchart illustrating an operation of a method of providing a search result according to exemplary embodiments of the present invention.

In operation S501, the search result providing system 100 may receive a keyword from a user.

In operation S502, the search result providing system 100 may determine an order for exposing a collection to be different according to a user preference for the collection of the keyword. As an example, when the user preference for the collection of the keyword exceeds a predetermined reference value, the search result providing system 100 may determine, using click information of the collection, the order for exposing the collection. In this instance, the search result providing system 100 may determine the order for exposing the collection using a number of instances a list of search results included in the collection is clicked on. Whereas, when the user preference for the collection of the keyword is less than a predetermined reference value, the search result providing system 100 may determine, using a default ranking of the collection, the order for exposing the collection.

In operation S503, the search result providing system 100 may apply, to a collection search bar, an order for exposing a collection including a list of search results for the keyword. In this instance, the search result providing system 100 may adjust a position of a collection tab included in the collection search bar according to the order for exposing the collection.

In operation S504, the search result providing system 100 may provide the user with a search result page, for the keyword, including the collection search bar. In this instance, when the user selects a collection tab from the search result page, the search result providing system 100 may provide a search result page on which a collection corresponding to the collection tab is displayed.

FIGS. 1 through 4 may be referred to for descriptions omitted from the description provided with reference to FIG. 5.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts. Examples of computer-readable media include magnetic media such as hard disks, floppy disks, and magnetic tape; optical media such as CD ROM discs and DVD; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

It is to be understood that both the foregoing general description and the following detailed description are exemplary and explanatory and are intended to provide further explanation of the invention as claimed.

The invention claimed is:

1. A system to provide a search result, the system comprising:
   a storage device; and
   a processor configured to execute program instructions stored in the storage device, the processor including,
      a keyword receiving unit configured to receive a keyword from a user,
      an exposure order applying unit configured to adjust an order of collection tabs in a collection search bar of a search result page according to a displaying order of collections in a list of collections displayed on the search result page, each of the collections in the list of collections representing categorized search results for the keyword, and the adjusted order of the collection tabs in the collection search bar being based on a characteristic of the keyword from the user, and
      a search result providing unit configured to provide the user with the search result page including the list of collections and the collection search bar, the collection search bar including the collection tabs in the adjusted order,
   wherein the collection search bar is displayed concurrently with the list of collections on the search result page,
   wherein the collection tabs in the collection search bar are oriented differently from the list of collections in the search result page,
   wherein each of the collection tabs corresponds to a collection in the list of collections, and
   wherein a position of each collection tab in the collection search bar is adjusted according to the displaying order of a corresponding collection in the list of collections on the search result page.

2. The system of claim 1, wherein, if the user selects a collection tab from the search result page, the search result providing unit is configured to provide a search result page displaying categorized search results represented by a collection, from among the list of collections, corresponding to the collection tab.

3. The system of claim 1, wherein the processor further comprises:
   an exposure order determining unit configured to determine the displaying order of the collections in the list of collections based on a user preference for the collections corresponding to the keyword.

4. The system of claim 3, wherein the exposure order determining unit is configured to determine the displaying order of the collections in the list of collections based on click information of the collections if the user preference for the collections exceeds a reference value.

5. The system of claim 3, wherein the exposure order determining unit is configured to determine the displaying order of the collections in the list of collections using a default ranking of the collections if the user preference for the collections is less than a reference value.

6. The system of claim 3, wherein the exposure order determining unit is configured to determine the displaying order of the collections in the list of collections based on a number of clicks associated with a search result included in each collection.

7. A method that uses a processor to provide a search result, the method comprising:
receiving a keyword from a user;
adjusting, by the processor, an order of collection tabs in a collection search bar of a search result page according to a displaying order of collections in a list of collections displayed on the search result page, each of the collections in the list of collections representing categorized search results for the keyword, and the adjusted order of the collection tabs in the collection search bar being based on a characteristic of the keyword; and
providing the user with the search result page including the list of collections and the collection search bar, the collection search bar including the collection tabs in the adjusted order,
wherein the collection search bar is displayed concurrently with the list of collections on the search result page,
wherein the collection tabs in the collection search bar are oriented differently from the list of collections in the search result page,
wherein each of the collection tabs corresponds to a collection in the list of collections, and
wherein a position of each collection tab in the collection search bar is adjusted according to the displaying order of a corresponding collection in the list of collections on the search result page.

8. A non-transitory computer-readable recording medium storing a program to instruct a computer, when executed by a processor, to perform the method of claim 7.

9. The method of claim 7, wherein, if the user selects a collection tab from the search result page, the method further includes,
displaying a search result page including categorized search results represented by a collection, from among the list of collections, corresponding to the selected collection tab.

10. The method of claim 7, further comprising:
determining the displaying order of the collections in the list of collections based on a user preference for at least one of the collections corresponding to the keyword.

11. The method of claim 10, wherein the displaying order of the collections in the list of collections is determined based on a default ranking of the collections if the user preference for the collections is less than a reference value.

12. The method of claim 10, wherein the displaying order of the collections in the list of collections is determined based on click information of the collections if the user preference for the collections exceeds a reference value.

13. The method of claim 12, wherein the displaying order of the collections in the list of collections is determined based on a number of clicks associated with a search result included in each collection.

14. An apparatus, comprising:
a storage device; and
a processor configured to execute program instructions stored in the storage device, the processor including,
a keyword receiving unit configured to receive a keyword,
an exposure order determining unit configured to,
retrieve a search result corresponding to the keyword,
generate categorized collections based on the search result, and
determine a displaying order of the categorized collections in a list of categorized collections,
an exposure order applying unit configured to determine an order of collection tabs in a collection search bar of a search result page according to the displaying order of the categorized collections in the list of categorized collections, each of the collection tabs corresponding to a collection from among the categorized collections, and the determined order of the collection tabs in the collection search bar being based on a characteristic of the keyword from the user, and
a search result providing unit configured to provide the search result page including the list of categorized collections and the collection search bar, the collection search bar including the collection tabs in the determine order,
wherein the collection search bar is displayed concurrently with the list of categorized collections on the search result page,
wherein the collection tabs in the collection search bar are oriented differently from the list of categorized collections in the search result page,
wherein each of the collection tabs in the collection search bar corresponds to a categorized collection in the list of categorized collections, and
wherein a position of each of the collection tabs in the collection search bar is adjusted according to the displaying order of the corresponding categorized collection in the list of categorized collections included in the search result page.

15. The apparatus of claim 14, wherein the search result providing unit is further configured to display a search result page including categorized search results represented by a categorized collection corresponding to a collection tab selected by the user.

16. The apparatus of claim 14, wherein the exposure order determining unit is further configured to,
determine whether to display the list of categorized collections based on click information associated with the keyword, if a user preference for at least one of the categorized collections is higher than or equal to a reference value.

17. The apparatus of claim 14, wherein the exposure order determining unit is further configured to determine the displaying order of the categorized collections in the list of categorized collections based on click information associated with the keyword.

18. The apparatus of claim 17, wherein the exposure order determining unit is further configured to,
determine click numbers for the categorized collections based on the click information, and
determine the displaying order of the categorized collections in the list of categorized collections according to the click numbers.

* * * * *